(12) United States Patent
Lentine et al.

(10) Patent No.: US 9,172,245 B1
(45) Date of Patent: Oct. 27, 2015

(54) INTELLIGENT ELECTRICAL OUTLET FOR COLLECTIVE LOAD CONTROL

(75) Inventors: Anthony L. Lentine, Albuquerque, NM (US); Justin R. Ford, Albuquerque, NM (US); Shannon V. Spires, Sandia Park, NM (US); Steven Y. Goldsmith, Rochester, MN (US)

(73) Assignee: Sandia Corporation, Albuquerque, NM (US)

( * ) Notice: Subject to any disclaimer, the term of this patent is extended or adjusted under 35 U.S.C. 154(b) by 526 days.

(21) Appl. No.: 13/619,469

(22) Filed: Sep. 14, 2012

Related U.S. Application Data (63) Continuation-in-part of application No. 13/241,054, filed on Sep. 22, 2011.

(60) Provisional application No. 61/594,001, filed on Feb. 2, 2012, provisional application No. 61/419,966, filed on Dec. 6, 2010.

(51) Int. Cl.
| | |
|---|---|
| *G05D 3/12* | (2006.01) |
| *G05D 5/00* | (2006.01) |
| *G05D 9/00* | (2006.01) |
| *G05D 11/00* | (2006.01) |
| *G05D 17/00* | (2006.01) |
| *H02J 3/00* | (2006.01) |
| *G06Q 50/06* | (2012.01) |
| *H02H 3/00* | (2006.01) |
| *H02H 3/05* | (2006.01) |
| *H02H 3/14* | (2006.01) |

(52) U.S. Cl.
CPC . *H02J 3/00* (2013.01); *G06Q 50/06* (2013.01); *H02H 3/006* (2013.01); *H02H 3/05* (2013.01); *H02H 3/14* (2013.01); *Y02B 20/40* (2013.01); *Y02B 20/48* (2013.01); *Y04S 20/16* (2013.01); *Y04S 20/221* (2013.01)

(58) Field of Classification Search
CPC ....... Y04S 20/16; Y04S 20/221; Y02B 20/48; Y02B 20/40
USPC .......................... 700/286, 291, 292, 295, 297
See application file for complete search history.

(56) References Cited

U.S. PATENT DOCUMENTS

| | | | | |
|---|---|---|---|---|
| 5,818,710 | A  * | 10/1998 | LeVan Suu | ..................... 700/12 |
| 6,453,687 | B2 * | 9/2002 | Sharood et al. | ................. 62/127 |
| 6,970,072 | B1 | 11/2005 | Cregg et al. | |
| 7,221,106 | B1 * | 5/2007 | Nemir | ................. H02M 5/2573 307/132 R |

(Continued)

OTHER PUBLICATIONS

Overview of BC-Hydro/BCIT Smart Microgrid; Hassan Farhangi; Jul. 2010; 44 pages.*

(Continued)

*Primary Examiner* — Ronald Hartman, Jr.

(57) ABSTRACT

Various technologies described herein pertain to an electrical outlet that autonomously manages loads in a microgrid. The electrical outlet can provide autonomous load control in response to variations in electrical power generation supply in the microgrid. The electrical outlet includes a receptacle, a sensor operably coupled to the receptacle, and an actuator configured to selectively actuate the receptacle. The sensor measures electrical parameters at the receptacle. Further, a processor autonomously controls the actuator based at least in part on the electrical parameters measured at the receptacle, electrical parameters from one or more disparate electrical outlets in the microgrid, and a supply of generated electric power in the microgrid at a given time.

17 Claims, 7 Drawing Sheets

(56) References Cited

U.S. PATENT DOCUMENTS

| | | | |
|---|---|---|---|
| 7,345,998 B2 | 3/2008 | Cregg et al. | |
| 7,642,670 B2 * | 1/2010 | Rosendahl | B60L 3/0069 307/10.1 |
| 7,956,492 B2 * | 6/2011 | Lee et al. | 307/38 |
| 7,983,799 B2 | 7/2011 | Bose et al. | |
| 7,990,908 B2 * | 8/2011 | Binder | H04L 12/2803 370/318 |
| 8,081,649 B2 | 12/2011 | Cregg et al. | |
| 8,174,148 B2 * | 5/2012 | Crucs | H02H 3/12 307/125 |
| 8,374,729 B2 * | 2/2013 | Chapel | H02J 13/0082 307/29 |
| 8,514,540 B2 * | 8/2013 | Besore et al. | 361/116 |
| 8,604,914 B2 * | 12/2013 | Clarke | 340/12.32 |
| 8,918,346 B2 * | 12/2014 | Lu et al. | 706/12 |
| 9,013,283 B1 * | 4/2015 | Tackaberry | G06Q 10/08 340/12.22 |
| 2003/0011348 A1 | 1/2003 | Lof et al. | |
| 2004/0130213 A1 * | 7/2004 | Goldsholl | H02M 7/064 307/11 |
| 2007/0276548 A1 * | 11/2007 | Uzunovic | G06F 1/266 700/297 |
| 2009/0192927 A1 * | 7/2009 | Berg et al. | 705/34 |
| 2010/0145540 A1 * | 6/2010 | McKenna | 700/295 |
| 2010/0179704 A1 | 7/2010 | Ozog | |
| 2010/0214109 A1 * | 8/2010 | Reynolds | G06F 1/26 340/664 |
| 2010/0280674 A1 * | 11/2010 | Jalili | G01D 4/002 700/295 |
| 2010/0305773 A1 * | 12/2010 | Cohen | H02J 3/14 700/296 |
| 2011/0015795 A1 * | 1/2011 | Boyer et al. | 700/286 |
| 2011/0082596 A1 | 4/2011 | Meagher et al. | |
| 2011/0082597 A1 | 4/2011 | Meagher | |
| 2011/0106322 A1 | 5/2011 | Ou | |
| 2012/0119577 A1 * | 5/2012 | Clarke | 307/40 |
| 2012/0223840 A1 * | 9/2012 | Guymon | H04B 3/54 340/870.02 |
| 2013/0245849 A1 * | 9/2013 | Paul | H02J 3/14 700/295 |
| 2014/0054963 A1 * | 2/2014 | Spitchka | G01D 4/002 307/40 |
| 2014/0103721 A1 * | 4/2014 | Lai | H01R 13/70 307/39 |
| 2014/0229031 A1 * | 8/2014 | Amarin et al. | 700/295 |
| 2014/0236372 A1 * | 8/2014 | Ewing | H04L 12/10 700/295 |
| 2014/0336960 A1 * | 11/2014 | Haghighat-Kashani et al. | 702/60 |
| 2014/0379156 A1 * | 12/2014 | Kamel et al. | 700/291 |
| 2015/0066227 A1 * | 3/2015 | Chapel | H04L 12/4633 700/295 |
| 2015/0088331 A1 * | 3/2015 | Fiedler | G05F 1/66 700/295 |

OTHER PUBLICATIONS

An Introduction to Microgrid for Integrated Distributed Generation and Energy Efficiency Applications; APSCOM Conference; Nov. 9, 2009; Saifur Rahman; 17 pages.*

Optimal Scheduling of Smart Homes Energy Consumption with Microgrid; ENERGY 2011; Zhang et al.; 6 pages.*

An Intelligent electrical outlet for autonomous load control for electric power grids with a large percentage of renewable resources; Lentine et al.; 8 pages; IEEE 2012.*

Ilic, et al., "Potential Benefits of Implementing Load Control", Retrieved at <<http://web.mit.edu/ilic/www/papers_pdf/potentialbenefits.pdf>>, IEEE Power Engineering Society Winter Meeting, 2002, vol. 1, pp. 177-182.

Choi, et al., "Architectural Design of Home Energy Saving System based on Realtime Energy-Awareness", Proceedings of 4th International Conference on Ubiquitous Information Technologies and Applications, 2009, pp. 1-5.

"X10 (industry standard", Retrieved at <<http://en.wikipedia.org/wiki/X10_%28industry_standard%29, Retrieval date Jul. 26, 2012, pp. 1-8.

"INSTEON—Specifications", Retrieved at <<http://www.insteon.net/about-specifications.html>>, Retrieval date Jul. 26, 2012, p. 1.

"Smart Grid Insights: Smart Appliances", Retrieved at <<http://smartgridresearch.org/2010/03/>>, ZPryme Research and Consulting, Mar. 2010, pp. 1-31.

"How Does the Modlet Work?", Retrieved at <<http://thinkecoinc.com/Product/Faq>>, Thinkeco, 2012, pp. 1-2.

"Green Power Saver Store.com", Retrieved at <<http://greenpowersaverstore.com/shop.html>>, Retrieval Date Jul. 26, 2012, pp. 1-2.

Peck, Akkana, "Tiny Linux Plug Computers: Wall Wart Linux Servers", Retrieved at <<http://www.linuxplanet.com/linuxplanet/tutorials/7279/1>>, Jan. 27, 2011, pp. 1-2.

* cited by examiner

INTELLIGENT ELECTRICAL OUTLET FOR COLLECTIVE LOAD CONTROL

CROSS-REFERENCE TO RELATED APPLICATION

This application claims the benefit of U.S. Provisional Patent Application Ser. No. 61/594,001, filed Feb. 2, 2012, and entitled "INTELLIGENT ELECTRICAL OUTLET." This application additionally is a continuation-in-part of U.S. patent application Ser. No. 13/241,054, filed Sep. 22, 2011, and entitled "COMPUTING ARCHITECTURE FOR AUTONOMOUS MICROGRIDS", which claims priority to U.S. Provisional Patent Application Ser. No. 61/419,966, filed Dec. 6, 2010, and entitled "AGENT-BASED INFORMATICS FOR AUTONOMOUS MICROGRIDS." The entireties of these applications are incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Recently, there has been a push to rethink how electric power is provided to consumers of such power. In conventional approaches, relatively large power plants burn fossil fuels to provide electric power to consumers. Typically, these power plants are controlled by private entities that bill consumers as a function of an amount of power utilized by the consumers over some period of time. A growing concern with respect to these types of power systems is the pollution that is generated by such systems, as well as the centralized nature of such systems. For example, if a natural disaster or other unexpected event occurred that caused a power system to be destroyed or temporarily go off-line, undesirable consequences may occur. For instance, millions of people may go months or even years without electric power if one of such conventional power systems is disabled.

In an attempt to reduce carbon emissions and other pollutants caused by these conventional power systems, distributed power systems that employ renewable energy to generate electric power have been manufactured and deployed. These types of power systems include, but are not limited to, wind turbine farms, hydro-turbines, solar panel fields, geothermal power systems, and the like. While these types of systems offer a promising alternative to the conventional power grid, there are some deficiencies corresponding to such systems. For instance, these types of systems generally output variable amounts of power over time, dependent upon time of day, weather conditions, etc., thereby rendering it difficult to meet changing demands of consumers.

The increased use of stochastic renewable resources, based on wind, solar, etc., may place pressure on the operational model of the conventional power grid. Various approaches can be used to compensate for variations in renewable generation. For instance, these approaches can include increased energy storage, fossil fuel backup generation (source following), controlling loads, operation over a larger geographic area, or a combination thereof to mitigate a likelihood of occurrence of a significant increase or decrease in power. However, difficulties associated with these approaches may intensity as a percentage of generation based on renewable resources increases. Moreover, grids over smaller geographic areas may be particularly susceptible to variations in generation as compared to conventional macrogrids.

Various approaches have conventionally been employed on the load side to attempt to deal with variations in generated electricity within a grid. For instance, utilities conventionally control power devices, such as air conditioners; however, such control tends to be on a slow time scale, usually with manual intervention. By way of another example, third-party vendors commonly provide demand response contracts, whereby they can bid a demand response similar to how generation is bid in the electricity markets, responding in hours or fractions thereof. According to another example, some home automation architectures are conventionally utilized for home energy management using sensors and actuators with centralized computers to manage home energy usage. Following this example, some conventional products strive to implement energy-saving architectures. In accordance with an illustration, users can program devices to respond to external commands communicated via information technology networks (e.g., the devices can be remotely controlled by a pre-programmed personal computer or manual commands initiated by a user). According to another illustration, some appliance manufacturers have provided products that can respond to external signals. For instance, some manufacturers have integrated sensors with actuators in smart UPS devices that, for example, can turn off printers when a computer is not drawing power.

SUMMARY

Described herein are various technologies that pertain to an electrical outlet that can autonomously manage loads in a microgrid. The electrical outlet can provide autonomous load control in response to variations in electrical power generation supply in the microgrid. The electrical outlet can include a receptacle, a sensor operably coupled to the receptacle, and an actuator configured to selectively actuate the receptacle. The sensor can measure electrical parameters at the receptacle. Further, a processor can autonomously control the actuator based at least in part on the electrical parameters measured at the receptacle, electrical parameters from one or more disparate electrical outlets in the microgrid, and a supply of generated electric power in the microgrid at a given time. Moreover, it is to be appreciated that the electrical outlet can include a plurality of receptacles, sensors operatively coupled to the receptacles, and actuators configured to selectively actuate the receptacles.

In accordance with various embodiments, the electrical outlet can include a communication module. The communication module can exchange data over a communication network with other electrical outlets using substantially any communication protocol. Such data can be used by each of the electrical outlets for autonomous load control.

According to various embodiments, the electrical outlet can monitor output from a source, where the source pushes electric power to a bus in the microgrid through the electric outlet. Moreover, the electrical outlet can measure a direction of power flow at a receptacle; based on the direction of power flow, an actuator can selectively actuate or deactuate the receptacle when connected to the source.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or

DETAILED DESCRIPTION

Various technologies pertaining to autonomous load management in a microgrid are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, an electrical outlet can autonomously control loads in a smart grid or microgrid environment without a centralized computer. The electrical outlet can include receptacles, each with voltage sensing, current sensing, and actuation. Further, the electrical outlet can include a processor for implementing closed loop control. The electrical outlet 102 can also include a communication module, which can communicate with other electrical outlets.

Figure 1:
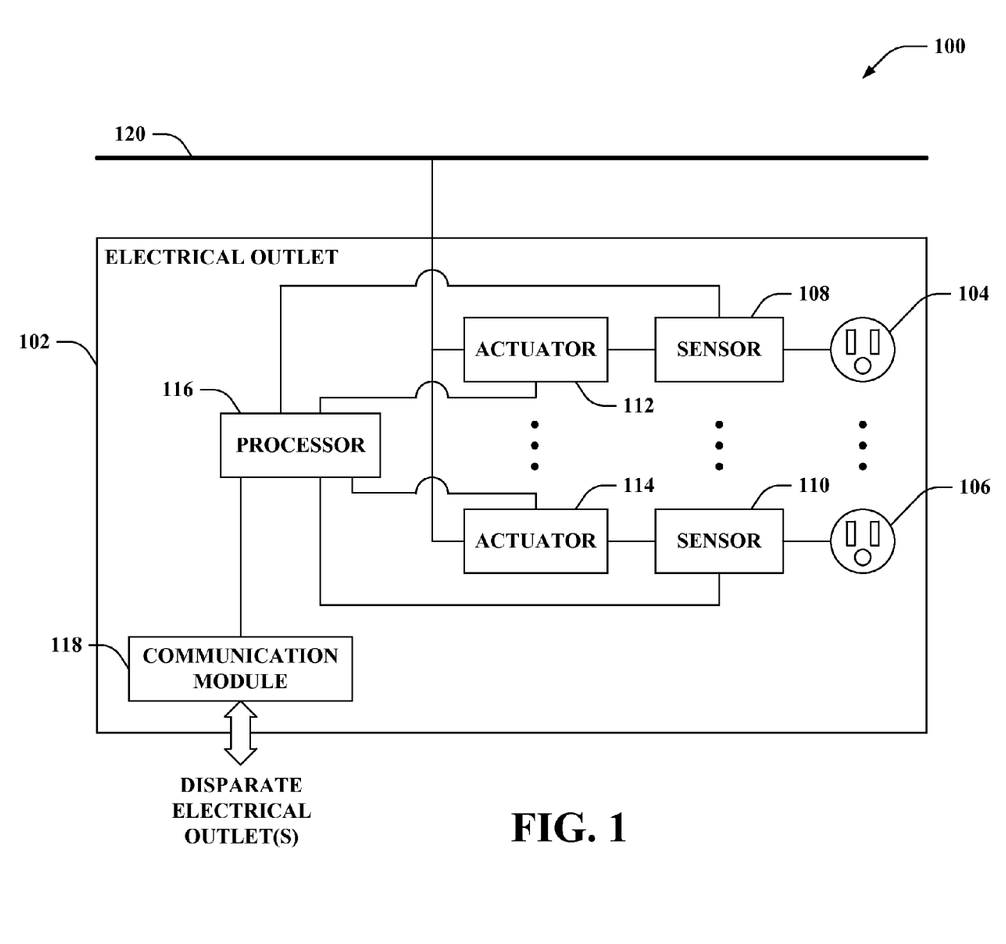
FIG. 1 illustrates a block diagram of an exemplary system that includes an electrical outlet that autonomously controls load.

Referring now to the drawings, FIG. 1 illustrates a system 100 that includes an electrical outlet 102 that autonomously controls load. The electrical outlet 102 can perform sensing, actuation, communications, and/or processing for autonomous load control in response to variations in generation supply. For instance, the electrical outlet 102 can perform functions such as load balancing to power availability (e.g., supplied at least in part by stochastic renewable resources); yet, it is to be appreciated that the claimed subject matter is not so limited.

The electrical outlet 102 includes a plurality of receptacles. More particularly, the electrical outlet 102 includes a first receptacle 104, . . . , and an Xth receptacle 106, where X can be substantially any integer (collectively referred to herein as receptacles 104-106). Sources and loads can be coupled with the receptacles 104-106. For example, the receptacle 104 can receive a plug of a source or a load; following this example, the source or the load is coupled with the receptacle 104 when the plug is received within the receptacle 104.

The electrical outlet 102 further includes a plurality of sensors, namely, a first sensor 108, . . . , and an Xth sensor 110 (collectively referred to herein as sensors 108-110). Moreover, the electrical outlet 102 includes a plurality of actuators, namely, a first actuator 112, . . . , and an Xth actuator 114 (collectively referred to herein as actuators 112-114). The electrical outlet 102 can include substantially any number of receptacles 104-106, sensors 108-110, and actuators 112-114 (e.g., X can be substantially any integer). However, it is also contemplated that the electrical outlet 102 can include one receptacle (e.g., the receptacle 104), one sensor (e.g., the sensor 108), and one actuator (e.g., the actuator 112). While it is to be appreciated that the electrical outlet 102 can include substantially any number of receptacles (and corresponding sensors and actuators), many of the below examples describe electrical outlets that include one or two receptacles; hence, such examples can be extended to electrical outlets that include differing numbers of receptacles.

The sensor 108 is operably coupled to the receptacle 104. Moreover, the actuator 112 is configured to selectively actuate the receptacle 104. Similarly, the sensor 110 is operably coupled to the receptacle 106, and the actuator 114 is configured to selectively actuate the receptacle 106. Other receptacle(s) of the electrical outlet 102 can likewise be operably coupled to corresponding sensor(s), and such receptacle(s) can be selectively actuated by corresponding actuator(s). The electrical outlet 102 further includes a processor 116 that autonomously controls the actuators 112-114 to selectively actuate the receptacles 104-106.

Further, the electrical outlet 102 can include a communication module 118 that can communicate with one or more disparate electrical outlets in a microgrid. The microgrid is a local power grid that comprises a plurality of sources of electric power. Further, one or more of the plurality of sources can generate variable amounts of electric power over time. The microgrid can include a bus 120, where the bus 120 is an equipotential bus that is accessible to loads and sources in the microgrid (e.g., via electrical outlets). Moreover, the communication module 118 can receive information related to a supply of generated electric power in the microgrid at a given time (e.g., information related to the supply of the generated electric power on the bus 120). The communication module 118 can also receive information related to electrical parameters from one or more disparate electrical outlets in the microgrid as well as transmit information related to electrical parameters measured by the sensors 108-110. According to an example, it is also contemplated that the communication module 118 can transmit data to and/or receive data from a collection computer (e.g., computer used for data collection and/or analysis); yet, it is to be appreciated that such collection computer need not be employed in the system 100.

The sensors 108-110 can measure electrical parameters at the receptacles 104-106, respectively. More particularly, the sensor 108 can measure electrical parameters at the receptacle 104, . . . , and the sensor 110 can measure electrical parameters at the receptacle 106. By way of example, the electrical parameters at the receptacles 104-106 can include voltage data, current data, reactive power data, real power data, power factor data, or the like. For instance, the sensors 108-110 can measure real and reactive components to power at the receptacles 104-106. Additionally or alternatively, the electrical parameters at the receptacles 104-106 can include direction of power flow at such receptacles 104-106; yet it is to be appreciated that the claimed subject matter is not so limited. Thus, by way of illustration, the sensor 108 can measure voltage data, current data, reactive power data, real power data, power factor data, direction of power flow, a combination thereof, etc. at the receptacle 104.

The actuators 112-114 are configured to selectively connect or disconnect the receptacles 104-106, respectively, from the bus 120. Thus, the actuator 112 is configured to selectively connect or disconnect the receptacle 104 from the bus 120, and so forth. The processor 116 can autonomously control the actuators 112-114 as a function of the electrical parameters measured by the sensors 108-110. Moreover, the processor 116 can autonomously control the actuators 112-114 as a function of the supply of the generated electric power in the microgrid (e.g., on the bus 120) at a given time.

According to an example, the processor 116 can autonomously control the actuator 112 based at least in part on the electrical parameters measured by the sensor 108 at the receptacle 104, the electrical parameters from the one or more disparate electrical outlets in the microgrid (e.g., received via the communication module 118), and the supply of the generated electric power in the microgrid at a given time. Similarly, the processor 116 can autonomously control the actuator 114 based at least in part on the electrical parameters measured at the receptacle 106 by the sensor 110, the electrical parameters from the one or more disparate electrical outlets in the microgrid (e.g., received via the communication module 118), and the supply of generated electric power in the microgrid at the given time. Further, the processor 116 can control the actuators 112-114 based at least in part on the electrical parameters measured at other receptacles 104-106 of the electrical outlet 102 (e.g., the processor 116 can control the actuator 112 based at least in part on the electrical parameters measured at the receptacle 106, etc.).

A microgrid, as the term is used herein, can refer to a collection of electric power sources (including energized storage devices) and electric power loads (including de-energized storage devices) and associated control systems, wherein at least some of the electric power sources are independently owned and operated, and the electric power loads are likewise independently owned and operated. Additionally, a microgrid, as the term is used herein, has a geographical constraint associated therewith, such that, for example, a microgrid may be confined to one square mile, five square miles, ten square miles, twenty square miles, etc. In an ideal scenario, the power sources in the microgrid provide sufficient power to supply the needs of the loads in the microgrid. In a microgrid, however, electric power sources may include power sources that are configured to output variable amounts of electric power over time, such as solar panels, wind turbines, geothermal power plants, or the like. Similarly, the loads in a microgrid may request varying amounts of electric power at different points in time. Microgrids may also be connected to a bulk power grid to provide power when generators and storage elements are unavailable.

In an exemplary embodiment, a microgrid may cover a portion of a city, wherein a subset of homeowners, business owners, etc. in such portion of the city purchase systems that are configured to generate electric power, including, but not limited to, systems that utilize renewable energy to generate electric power, such as solar panels, micro-wind turbines, etc. Other homeowners, businesses, or the like in the microgrid may purchase and operate micro gas turbine generators that are configured to burn natural gas, for example, to output electric power. The requests for electric power from the loads will vary over time, such that more electric power is collectively requested from the loads at certain times of day, days of week, seasons, etc., than others.

According to an example, in a microgrid, a supply of generated electric power on the bus 120 at a given time can include power generated from storage (e.g., batteries). Moreover, charging or storing energy (e.g., in the batteries) can be a load on the bus 120.

The electrical outlet 102 can be an autonomous load control device. A collective of electrical outlets, such as the electrical outlet 102 and the disparate electrical outlets, can be described as a load cohort in an agent-based architecture for controlling generation, load, and storage in a microgrid collective as described in U.S. patent application Ser. No. 13/241,054. A function of the load cohort can be to receive information related to the availability of generation, and use that information to determine an optimal distribution of load among the members of the cohort that will maintain network stability while satisfying as much of the desired load as possible. In such architecture, sources can also be connected to the microgrid from a collection of connection agents.

In accordance with various embodiments, the electrical outlet 102 can function as or include an agent as described in U.S. patent application Ser. No. 13/241,054. Additionally or alternatively, the electrical outlet 102 can communicate with agents using protocols set forth in U.S. patent application Ser. No. 13/241,054. According to an example, the electrical outlet 102 can function as a connection agent. By way of another example, the electrical outlet 102 can communicate with a connection agent. Yet, it is to be appreciated that the claimed subject matter is not limited to the foregoing examples (e.g., the electrical outlet 102 can function as and/or communicate with other types of agents such as a load agent, etc.).

As loads are distributed within a microgrid comprised of many individual homes or businesses, each electrical outlet can represent a scaling of the controllable loads for each of those homes or businesses. As the architecture extends to larger numbers of homes and businesses, use of a distributed architecture, such as presented herein, can provide various scaling advantages.

The electrical outlet 102 can acquire voltage and current data as a function of time utilizing the sensors 108-110. For instance, such data acquired by the sensors 108-110 can include phase angle or power factor data; yet, it is to be appreciated that the claimed subject matter is not so limited. Moreover, the communication module 118 can transmit such data to other electrical outlets. Further, in the electrical outlet 102, actuation of individual channels can be controlled manually and/or autonomously. The electrical outlet 102 can implement an autonomous, scalable algorithm to adjust load to available generation of electrical power. Further, it is contemplated that the electrical outlet 102 can permit manual override functions; yet, the claimed subject matter is not so limited.

Figure 2:
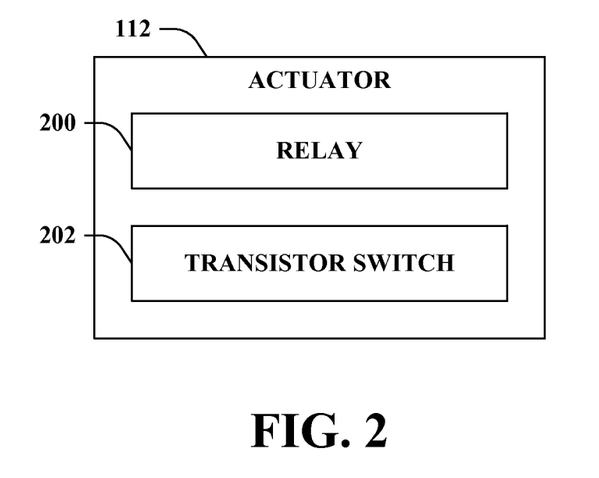
FIG. 2 illustrates a block diagram of an exemplary actuator of the electrical outlet of FIG. 1.

Turning to FIG. 2, illustrated is the actuator 112 of the electrical outlet 102. It is to be appreciated that the remaining actuators 112-114 of the electrical outlet 102 of FIG. 1 (other than the actuator 112) can be substantially similar to the actuator 112 described in FIG. 2.

The actuator 112 includes a relay 200 configured to switch the receptacle 104 between an on state and an off state. The relay 200 can be a normally on relay. Accordingly, if the electrical outlet 102 malfunctions, then the electrical outlet 102 can still be usable in a manual mode. The relay 200 can allow full on and full off actuation with minimal switch resistance.

Moreover, the actuator 112 includes a transistor switch 202 (e.g., field effect transistor (FET) circuit) configured to control a duty cycle at the receptacle 104. The transistor switch 202 can control an effective load at the receptacle 104 using pulse width modulation. For example, a resistive load value of a load coupled to the receptacle 104 can be reduced incrementally when the transistor switch 202 provides a duty cycle less than 100% using pulse width modulation. The transistor switch 202 can allow a load to be controlled with greater precision as compared to control provided by the relay 200. According to an example, a light can be dimmed using pulse width modulation with the transistor switch 202. The transistor switch 202 can allow for load duty cycling from 0-100% at a higher switch resistance as compared to the relay 200.

The relay 200 and the transistor switch 202 can be connected in series or in parallel (e.g., between the bus 120 and the sensor 108 of the electrical outlet 102 to control current to the receptacle 104); however, substantially any circuit configuration is intended to fall within the scope of the hereto appended claims. Further, the relay 200 and the transistor switch 202 can be controlled by the processor 116 of the electrical outlet 102.

Moreover, each of the receptacles 104-106 of the electrical outlet 102 can include separate, respective relays and transistor switches (e.g., similar to the relay 200 and the transistor switch 202) to control currents to the receptacles 104-106.

Figure 3:
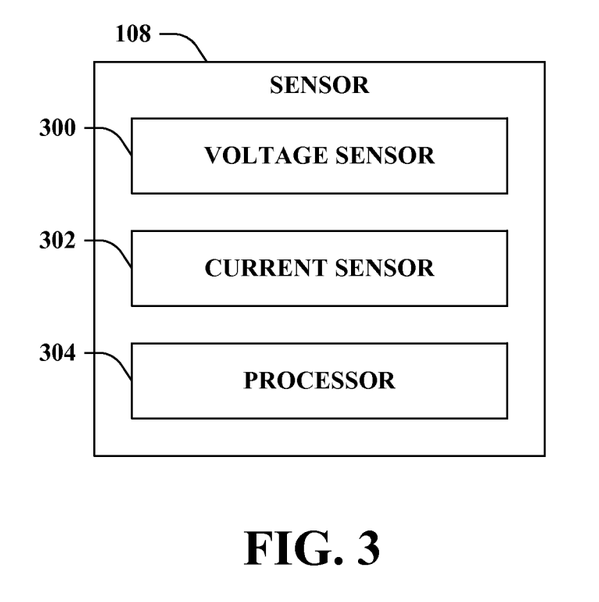
FIG. 3 illustrates a block diagram of an exemplary sensor of the electrical outlet of FIG. 1.

With reference to FIG. 3, illustrated is the sensor 108 of the electrical outlet 102. It is to be appreciated that the remaining sensors 108-110 of the electrical outlet 102 of FIG. 1 (other than the sensor 108) can be substantially similar to the sensor 108 described in FIG. 3.

The sensor 108 includes a voltage sensor 300. The voltage sensor 300 can include a resistive divider that measures voltage at the receptacle 104 of the electrical outlet 102. The voltage sensor 300 can generate a voltage waveform based on the measured voltage at the receptacle 104. Moreover, the sensor 108 includes a current sensor 302. The current sensor 302 can include a hall-effect sensor that measures current at the receptacle 104 of the electrical outlet 102. The current sensor 302 can generate a current waveform based on the measured current at the receptacle 104.

The sensor 108 further includes a processor 304. The processor 304 can be a measurement integrated circuit (IC). The processor 304 can sample the waveforms generated by the voltage sensor 300 and the current sensor 302. Based on the sampling of the waveforms, the processor 304 can derive higher level signals. For example, the processor 304 can determine root mean square (RMS) voltages and currents, reactive and real power consumption, and so forth.

Thus, the sensor 108 (e.g., the processor 304) can measure real and reactive power, power flow direction, and RMS currents and voltages. Further, the sensor 108 can measure voltage on a load side of the actuator (e.g., the load side of the actuator 112 of the electrical outlet 102). While real and reactive powers can be measured by the sensor 108, apparent powers can be calculated from either $I_{RMS}$ and $V_{RMS}$ or from real and reactive powers measured by the sensor 108 (e.g., the processor 304).

Figure 4:
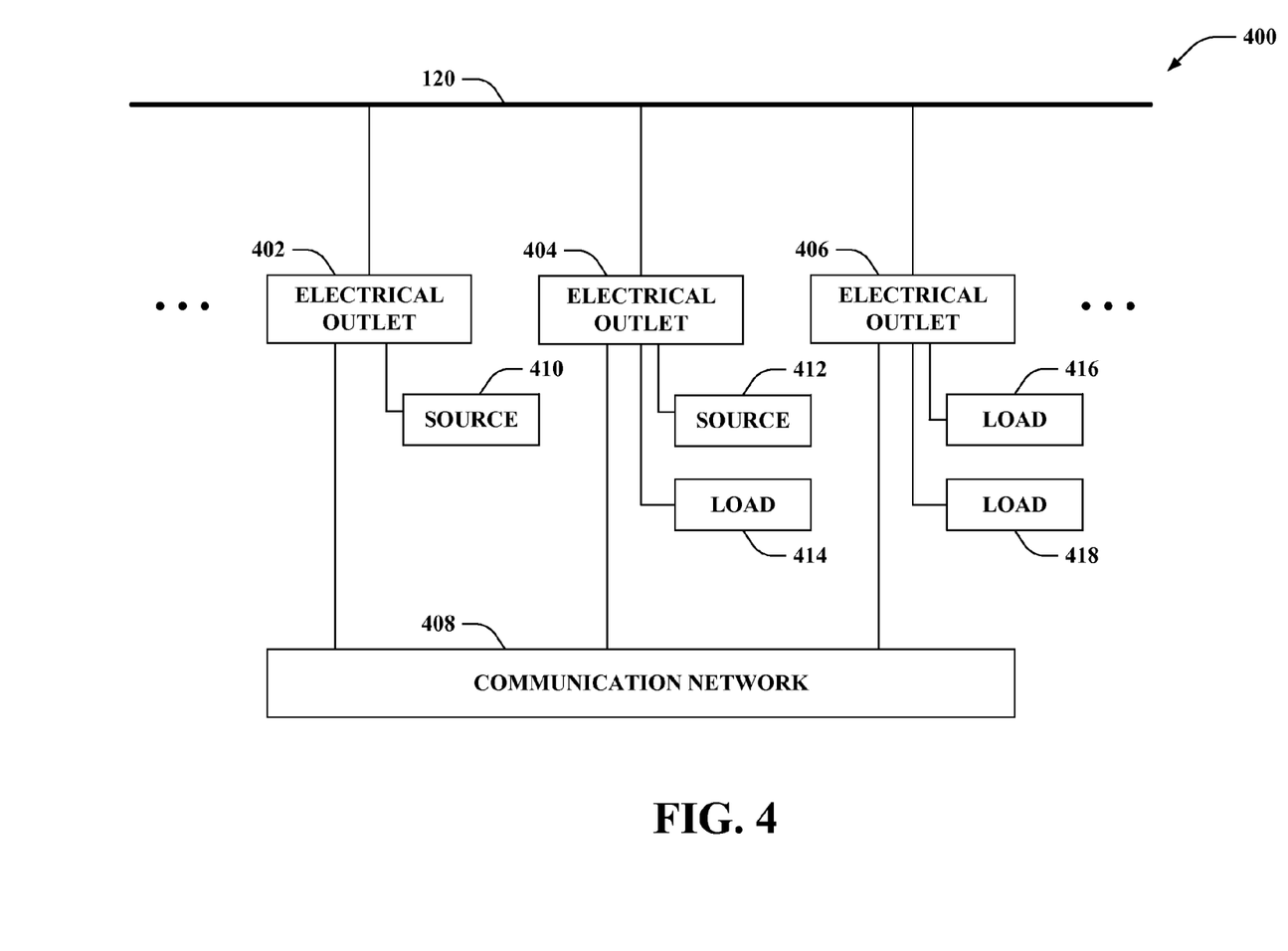
FIG. 4 illustrates a block diagram of an exemplary system that includes a plurality of electrical outlets that autonomously control loads in a microgrid.

Now referring to FIG. 4, illustrated is a system 400 that includes a plurality of electrical outlets that autonomously control loads in a microgrid. FIG. 4 depicts three electrical outlets, namely, an electrical outlet 402, an electrical outlet 404, and an electrical outlet 406 (collectively referred to as electrical outlets 402-406); however, it is to be appreciated that the microgrid can include substantially any number of electrical outlets. The electrical outlets 402-406 can each be substantially similar to the electrical outlet 102 of FIG. 1. Moreover, the electrical outlets 402-406 can each be connected to the bus 120.

Further, the electrical outlets 402-406 can communicate with each other (e.g., employing communication modules such as the communication module 118 of FIG. 1) via a communication network 408. The communication network 408 can be substantially any type of wired or wireless communication network that allows for exchange of data between the electrical outlets 402-406. Moreover, substantially any type of communication protocol can be utilized for exchanging data over the communication network 408.

Each of the electrical outlets 402-406 can broadcast information over the communication network 408. Moreover, the electrical outlets 402-406 can receive broadcasted information via the communication network 408. By way of example, the electrical outlet 402 can broadcast information over the communication network 408, and such broadcasted information can be received by the electrical outlet 404 and the electrical outlet 406, and so forth.

By way of example, the communication network 408 can be an Ethernet-based network. Pursuant to an illustration, communication modules (e.g., the communication module 118) of the electrical outlets 402-406 can be bridge modules (e.g., Ethernet bridge modules). Further, respective Internet Protocol (IP) addresses can be assigned to the electrical outlets 402-406. Data can be exchanged over such communication network using User Datagram Protocol (UDP) packets, for example. Yet, it is to be appreciated that the claimed subject matter is not limited to the foregoing.

In accordance with other examples, the communication network 408 can be a power line communication (PLC)-based network or a wireless communication-based network. However, it is to be appreciated that the claimed subject matter is not so limited.

Loads and/or sources can be connected to the electrical outlets 402-406 (e.g., connected to receptacles of the electrical outlets 402-406). In the example depicted in FIG. 4, a source 410 is connected to the electrical outlet 402, a source 412 and a load 414 are connected to the electrical outlet 404, and a load 416 and a load 418 are connected to the electrical outlet 406. It is to be appreciated, however, that FIG. 4 is presented for illustration purposes, and the claimed subject matter is not limited to such example.

The source 410 and the source 412 can generate electric power and push such electric power to the bus 120. Moreover, the load 414, the load 416, and the load 418 can pull electrical power from the bus 120 (e.g., when receptacles to which such loads are respectively connected are actuated). The electrical outlets 402-406 can sense electrical parameters (e.g., at receptacles) associated with the sources and/or loads respectively connected thereto, exchange information related to the sensed electrical parameters over the communication network 408, and selectively actuate receptacles to which the sources and/or loads are connected.

Figure 5:
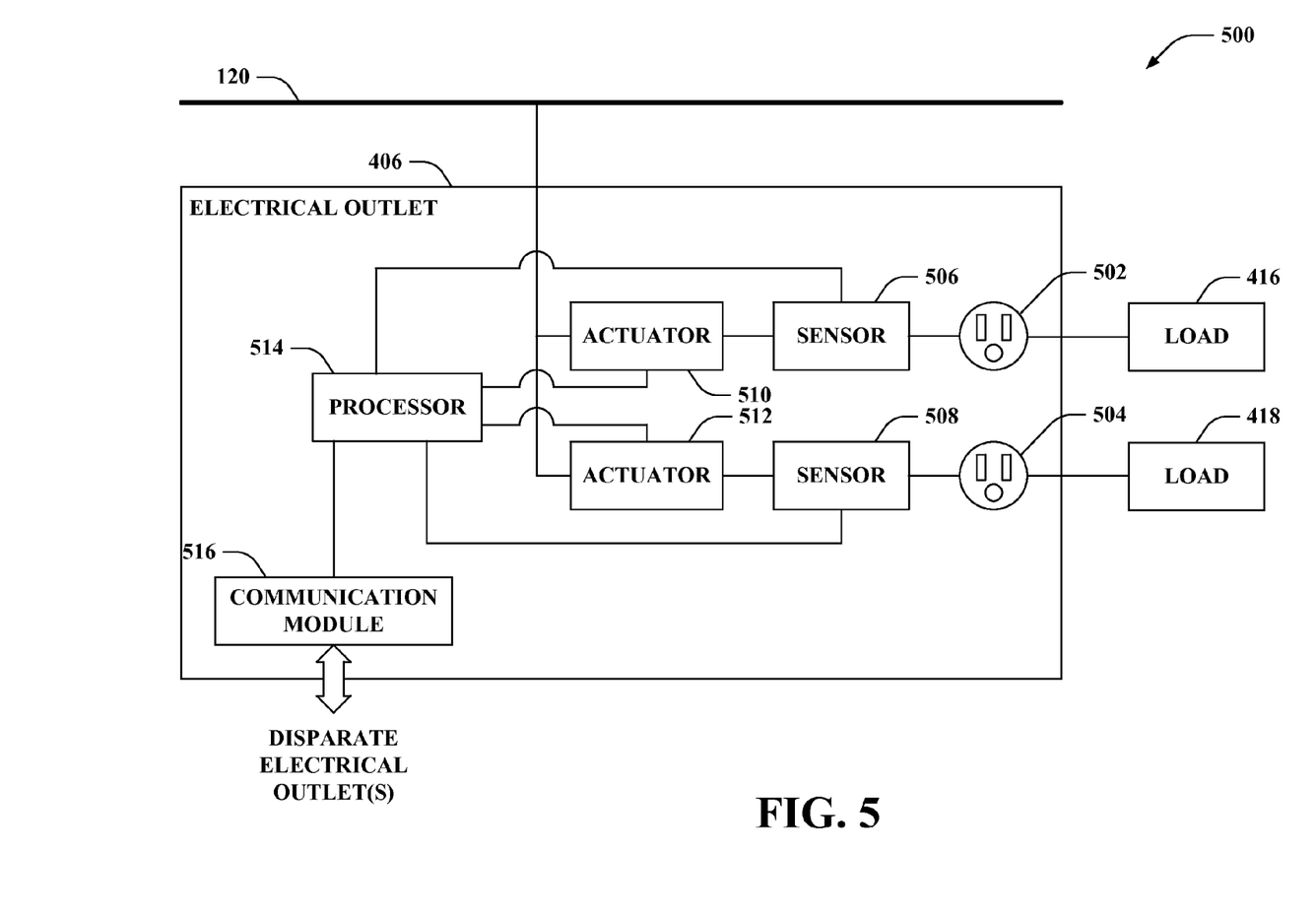
FIG. 5 illustrates a block diagram of an exemplary system that includes one of the electrical outlets of FIG. 4.

With reference to FIG. 5, illustrated is a system 500 that includes the electrical outlet 406 of FIG. 4 and the bus 120 (e.g., the system 500 includes a portion of the system 400 of FIG. 4). Moreover, similar to the electrical outlet 102 of FIG. 1, the electrical outlet 406 includes a receptacle 502, a receptacle 504, a sensor 506, a sensor 508, an actuator 510, an actuator 512, a processor 514, and a communication module 516. As noted above, the load 416 and the load 418 are connected to the electrical outlet 406. More particularly, the load 416 is connected to the receptacle 502 and the load 418 is connected to the receptacle 504 of the electrical outlet 406.

The sensors 506-508 can measure the loads 416-418. For instance, if the loads 416-418 are turned on, the sensors 506-508 can respectively measure electrical parameters associated with the loads 416-418 at the respective receptacles 502-504 to which such loads 416-418 are connected. Alternatively, if the load 416 or the load 418 is presently turned off at a particular time, such load can momentarily be turned on to enable measurement by the respective sensors 506-508. A length of time for turning on such load may vary. For instance, the length of time can be dependent upon the type of load, an amount of time to actuate a relay (e.g., included in the actuators 510-512), measurement IC latency, etc. According to an example, a length of time for turning on a load may be on the order of 100 ms; yet, it is contemplated that the claimed subject matter is not so limited.

It is contemplated that substantially any type of load can be connected to the electrical outlet 406 (e.g., the load 416 and the load 418 can be substantially any load type(s)). Examples of the load types include always on, always off, or controllable. Always on loads are referred to herein as non-controllable loads. A type of load connected to each of the receptacles 502-504 of the electrical outlet 406 can be preset, for instance; it is to be appreciated that the type of load can be preset in substantially any manner. Moreover, the load type of each of the loads 416-418 can be detected by the electrical outlet 406, determined based on user input, or the like. By way of illustration, an always on load can be a load associated with supplying oxygen to a patient, whereas a controllable load may be a load associated with running an air conditioner in a house. It is to be appreciated, however, that the claimed subject matter is not limited to the foregoing illustration.

Receptacles 502-504 of the electrical outlet 406 can be designated as being connected to either an always on load or a controllable load. According to an example, the load 416 can be an always on load and the load 418 can be a controllable load. Following this example, the receptacle 502 can be designated as being connected to an always on load, while the receptacle 504 can be designated as being connected to a controllable load.

The processor 514 can utilize various algorithms to implement cooperative controlling of loads. More particularly, the processor 514 can control the actuators 510-512 such that always on loads are powered independently of available power. Moreover, the processor 514 can control the actuators 510-512 such that, after always on loads are satisfied, the remaining available power can be split among the controllable loads.

To effectuate cooperative controlling of loads, each electrical outlet (e.g., the electrical outlets 402-406 of FIG. 4, etc.) can communicate a sum of its always on loads and a sum of its total loads within the microgrid. For instance, the communication module 516 can broadcast a total load value for the electrical outlet 406 and a total always on load value for the electrical outlet 406. The total load value can be a sum of controllable and non-controllable loads on the electrical outlet 406 (e.g., sum of the load 416 and the load 418). The always on load value can be a sum of non-controllable loads on the electrical outlet 406 (e.g., the load 416 in the above example where the load 416 is an always on load and the load 418 is a controllable load). Moreover, the communication module 516 can receive respective total load values and respective total always on load values broadcasted from each of the other disparate electrical outlets in the microgrid (e.g., from the electrical outlet 402 and the electrical outlet 404 of FIG. 4, etc.). Each of the respective total load values can be a sum of controllable and non-controllable loads on a corresponding disparate electrical outlet. Further, each of the respective total always on load values can be a sum of non-controllable loads on the corresponding disparate electrical outlet.

The processor 514 can control the actuators 510-512 as a function of a first sum of the respective total load values received from the disparate electrical outlet(s) and a total load value for the electrical outlet 406, a second sum of the respective total always on load values received from the disparate electrical outlet(s) and a total always on load value for the electrical outlet 406, the total load value for the electrical outlet 406, the total always on load value for the electrical outlet 406, and the supply of generated electric power in the microgrid at the given time (e.g., on the bus 120).

For example, the processor 514 can set a maximum current, $I_{max\_i}$, to $$I_{max\_i} = On_i + \frac{\text{Loads}_i}{\text{TotalLoads}}(PV_{max} - TotalOn) \quad (1)$$

where $On_i$ is the sum of the loads on the electrical outlet i that are always on (e.g., the total always on load value for the electrical outlet 406), $\text{Loads}_i$ is the sum of all loads on the electrical outlet i (e.g., the total load value for the electrical outlet 406), TotalLoads is the sum of the loads on all the electrical outlets (e.g., the first sum of the respective total load values received from the disparate electrical outlet(s) and the total load value for the electrical outlet 406), TotalOn is the sum of the loads that are always on for all the electrical outlets (e.g., the second sum of the respective total always on load values received from the disparate electrical outlet(s) and the total always on load value for the electrical outlet 406), and $PV_{max}$ is the current generated within the microgrid (e.g., corresponding to the supply of generated electric power in the microgrid). It is to be appreciated, however, that different fractions can be utilized in the foregoing equation. For example, $$\frac{\text{Loads}_i}{\text{TotalLoads}}$$

can be replaced by a fraction of discretionary loads. According to another example, such fraction can be replaced by an equal split across all electrical outlets, 1/N, where N is the number of electrical outlets (e.g., N can be substantially any integer).

According to an example, apparent power can be utilized in the foregoing algorithm. By way of another example, the foregoing algorithm can be based on reactive power differences in the loads.

Moreover, it is contemplated that the algorithm set forth above is an example implementation for controlling loads, and other implementations for controlling loads are intended to fall within the scope of the hereto appended claims. By way of illustration, another implementation can utilize intelligent agents as provided in U.S. patent application Ser. No. 13/241,054; yet, the claimed subject matter is not so limited.

Again, it is noted that electrical outlets (e.g., the electrical outlets 402-406 of FIG. 4) can each broadcast two quantities, namely, a total load value and a total always on load value.

Such values may change in infrequently. Electrical outlets can acquire these values from other electrical outlets (e.g., directly or indirectly via the communication network 408 of FIG. 4) and sum such values. The foregoing algorithm can be scalable in that the calculation is dependent on the values for a given electrical outlet as well as global sums of the values.

Figure 6:
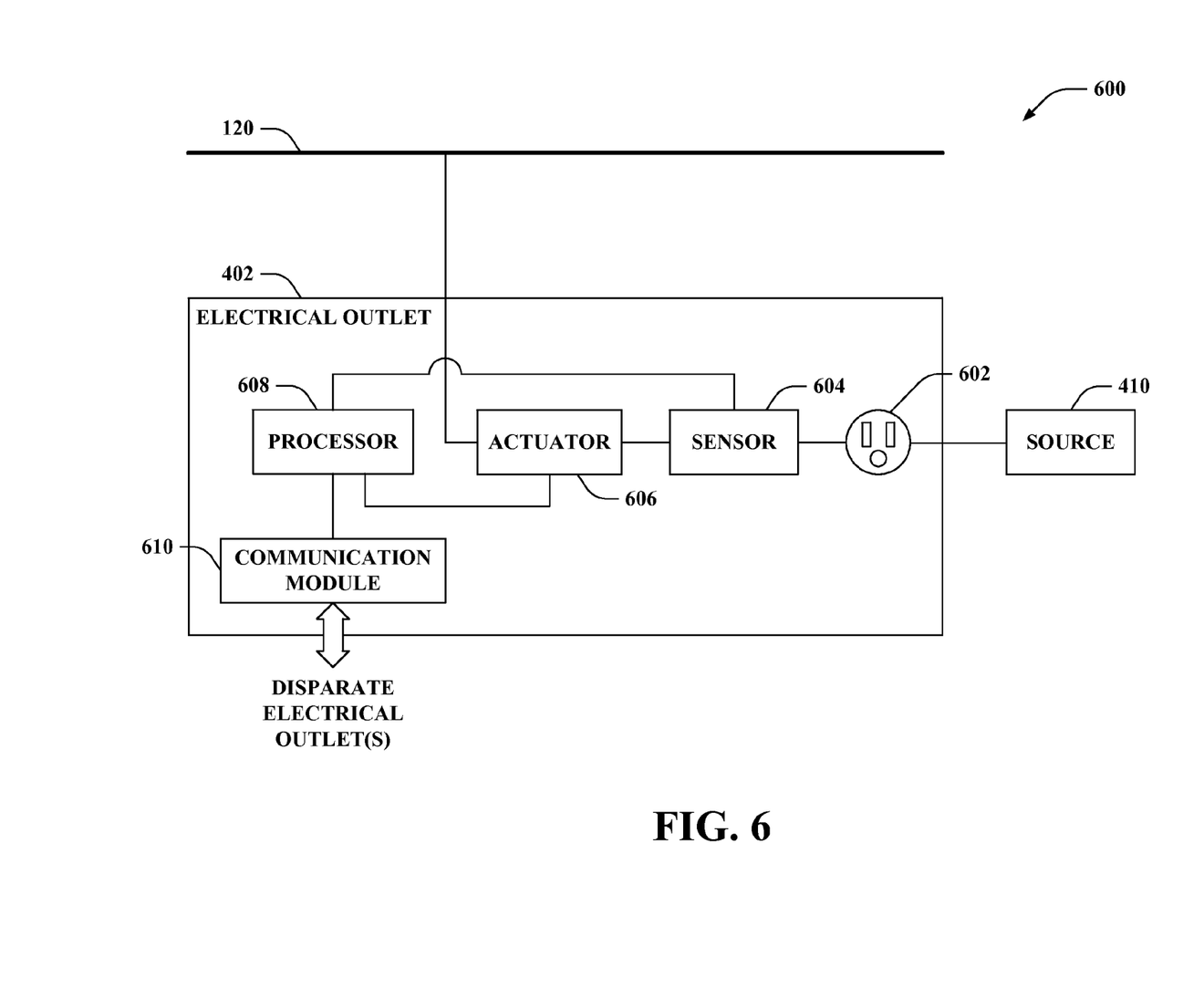
FIG. 6 illustrates a block diagram of an exemplary system that includes a disparate one of the electrical outlets of FIG. 4.

Turning to FIG. 6, illustrated is a system 600 that includes the electrical outlet 402 of FIG. 4 and the bus 120 (e.g., the system 600 includes a portion of the system 400 of FIG. 4). Similar to the electrical outlet 102 of FIG. 1, the electrical outlet 402 includes a receptacle 602, a sensor 604, an actuator 606, a processor 608, and a communication module 610. As noted above, the source 410 is connected to the electrical outlet 402. More particularly, the source 410 is connected to the receptacle 602 of the electrical outlet 406.

The sensor 604 of the electrical outlet 402 can measure a direction of power flow at the receptacle 602. For example, based on the measured direction of power flow at the receptacle 602, the actuator 606 can selectively actuate or deactuate the receptacle 602. More particularly, the actuator 606 can deactuate the receptacle 602 when the sensor 604 detects that the direction of power flow at the receptacle 602 changes from flowing into the receptacle 602 from the source 410 to flowing out of the receptacle 602 to the source 410. Thus, the source 410 can be turned off (e.g., the receptacle 602 can be deactuated) when power flow is determined to flow out from the receptacle 602 to the source 410 since, under such conditions, the source 410 is not supplying current and instead acts as a load.

According to an example, the source 410 can be a photovoltaic (PV) inverter. Accordingly, the sensor 604 can measure an output from the PV inverter coupled to the receptacle 602. The electrical outlet 402 can act as a monitor for available current generated by the PV inverter. Output from the PV inverter measured using the electrical outlet 402 can be communicated to disparate electrical outlets via the communication module 610. Accordingly, electrical outlets can receive such information from other electrical outlets that monitor current generated by sources, such as the PV inverter. It is to be appreciated, however, that other types of sources other than or in addition to PV inverters are intended to fall within the scope of the hereto appended claims.

Again, reference is made to FIG. 4. According to an example, the electrical outlet 406 can receive information related to generated electric power communicated by the electrical outlet 402 (connected to the source 410) and information related to generated electric power communicated by the electrical outlet 404 (connected to the source 412). Such information can be summed to determine the supply of generated electric power in the microgrid at the given time.

According to an example, to mitigate sending information over either a large geographic extent or sending a large quantity of information due to large numbers of controllable elements, a transmission agent can be introduced at boundaries between adjacent microgrids. According to another example, communication gateways can be used to aggregate information from electrical outlets, and can transmit that information to other microgrids. Received information can be farmed out to individual elements. In this manner, each electrical outlet can receive information from n−1 outlets in its microgrid (where n is a number of electrical outlets in the microgrid) and m−1 elements as an aggregate from other electrical outlets (where m is a number of electrical outlets in other microgrid(s)). It is to be appreciated, however, that the claimed subject matter is not limited to the foregoing examples.

Figure 7:
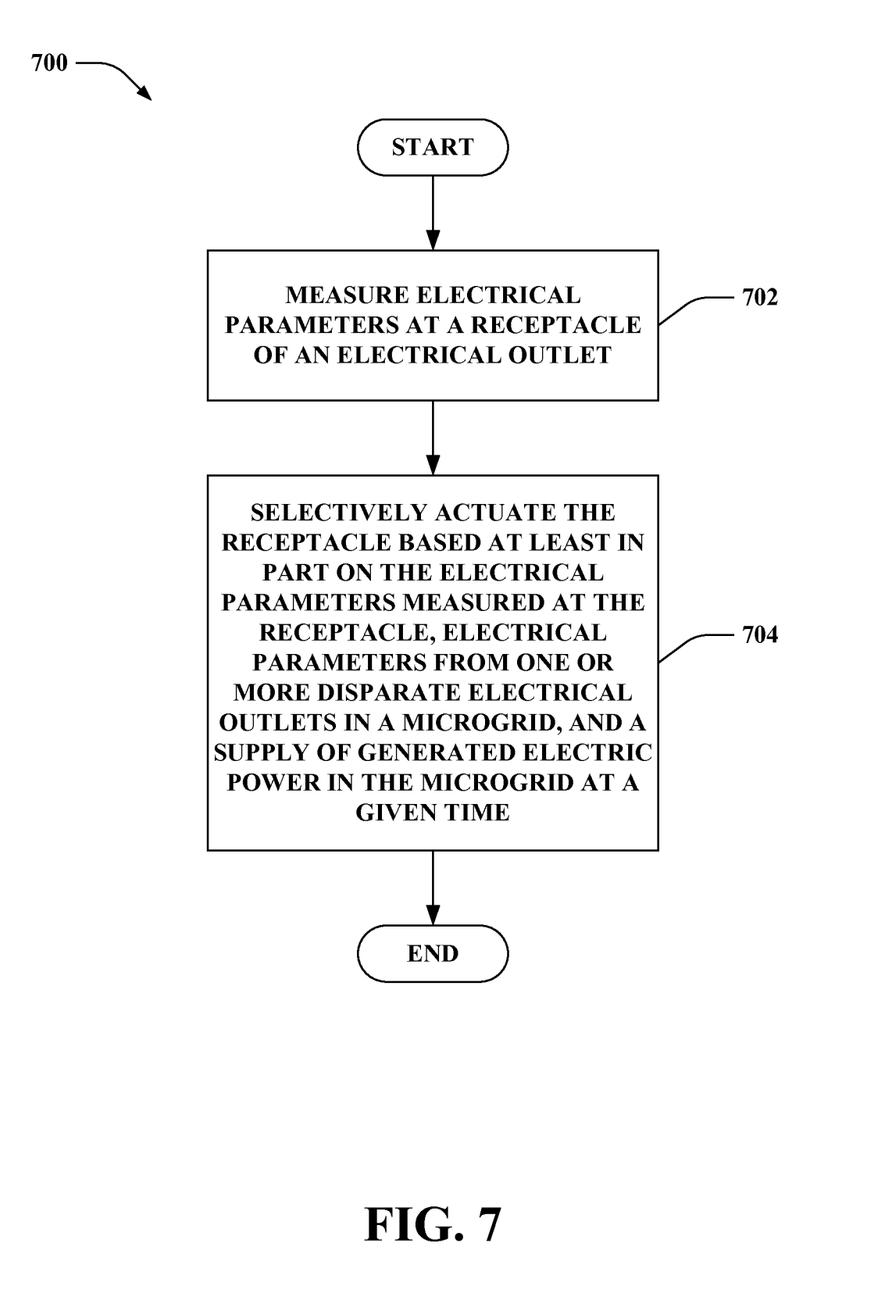
FIG. 7 is a flow diagram that illustrates an exemplary methodology of controlling a receptacle of an electrical outlet in a microgrid.

FIG. 7 illustrates an exemplary methodology relating to utilization of a receptacle of an electrical outlet in a microgrid. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

FIG. 7 illustrates a methodology 700 of controlling a receptacle of an electrical outlet in a microgrid. The microgrid, for instance, can be a local power grid that includes a plurality of sources of electric power, where one or more of the plurality of sources generate variable amounts of electric power over time. At 702, electrical parameters at the receptacle of the electrical outlet can be measured. According to an example, a direction of power flow can be measured at the receptacle; yet, it is to be appreciated that other electrical parameters can additionally or alternatively be measured at the receptacle. At 704, the receptacle can be selectively actuated based at least in part on the electrical parameters measured at the receptacle, electrical parameters from one or more disparate electrical outlets in the microgrid, and a supply of generated electric power at a given time.

Figure 8:
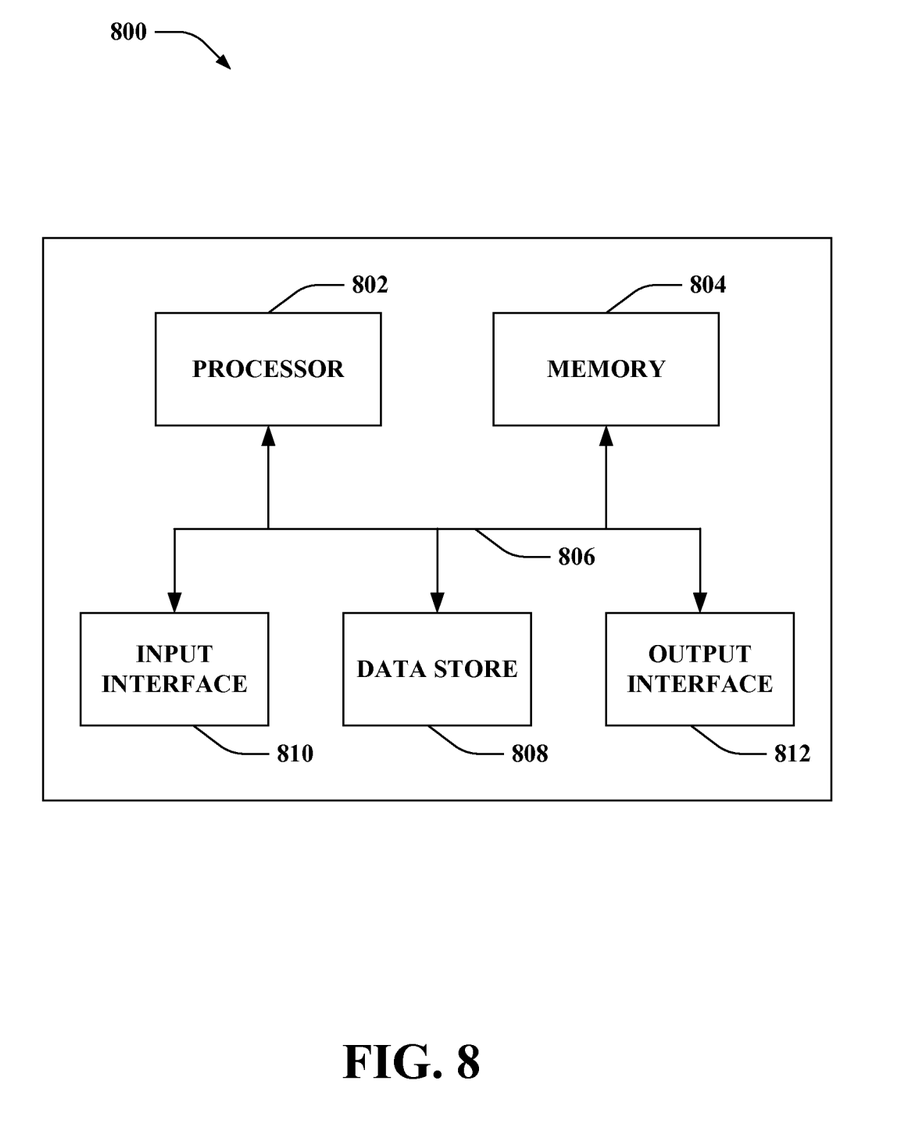
FIG. 8 illustrates an exemplary computing device.

Referring now to FIG. 8, a high-level illustration of an exemplary computing device 800 that can be used in accordance with the systems and methodologies disclosed herein is illustrated. For instance, the computing device 800 may be used in a system that measures electrical parameters at receptacle(s) in an electrical outlet, selectively actuates the receptacle(s), and/or exchanges information between electrical outlets in a microgrid. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store measured electrical parameters, electric power supply information, information related to load(s) connected to receptacle(s), and so forth.

The computing device 800 additionally includes a data store 808 that is accessible by the processor 802 by way of the system bus 806. The data store 808 may be or include any suitable computer-readable storage, including a hard disk, memory, etc. The data store 808 may include executable instructions, measured electrical parameters, electric power supply information, information related to load(s) connected to receptacle(s), etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An electrical outlet, comprising:
a receptacle;
a sensor operably coupled to the receptacle, wherein the sensor measures electrical parameters at the receptacle;
an actuator configured to selectively actuate the receptacle; and
a processor that autonomously controls the actuator based at least in part on the electrical parameters measured at the receptacle, electrical parameters from one or more disparate electrical outlets in a microgrid, and a supply of generated electric power in the microgrid at a given time, wherein the microgrid is a local power grid that comprises a plurality of sources of electric power, and wherein one or more of the plurality of sources generate variable amounts of electric power over time.

2. The electrical outlet of claim 1, further comprising:
a second receptacle;
a second sensor operably coupled to the second receptacle, wherein the second sensor measures electrical parameters at the second receptacle; and
a second actuator configured to selectively actuate the second receptacle;
wherein the processor autonomously controls the actuator and the second actuator at least in part on the electrical parameters measured at the receptacle, the electrical parameters measured at the second receptacle, the electrical parameters from the one or more disparate electrical outlets, and the supply of the generated electrical power in the microgrid at the given time.

3. The electrical outlet of claim 1, further comprising a communication module that communicates with the one or more disparate electrical outlets in the microgrid.

4. The electrical outlet of claim 3, wherein the communication module broadcasts a total load value for the electrical outlet and a total always on load value for the electrical outlet, wherein the total load value is a sum of controllable and non-controllable loads on the electrical outlet and the total always on load value is a sum of non-controllable loads on the electrical outlet.

5. The electrical outlet of claim 3, wherein the communication module receives respective total load values and respective total always on load values broadcasted from each of the one or more disparate electrical outlets in the microgrid, wherein each of the respective total load values is a sum of controllable and non-controllable loads on a corresponding one of the one or more disparate electrical outlets and each of the respective total always on load values is a sum of non-controllable loads on the corresponding one of the one or more disparate electrical outlets.

6. The electrical outlet of claim 5, wherein the processor controls the actuator as a function of a first sum of the respective total load values received from the one or more disparate electrical outlets and a total load value for the electrical outlet, a second sum of the respective total always on load values received from the one or more disparate electrical outlets and a total always on load value for the electrical outlet, the total load value for the electrical outlet, the total always on load value for the electrical outlet, and the supply of generated electric power in the microgrid at the given time.

7. The electrical outlet of claim 3, wherein the communication module receives information related to the supply of the generated electric power in the microgrid at the given time.

8. The electrical outlet of claim 1, wherein the sensor measures an output from a photovoltaic (PV) inverter coupled to the receptacle.

9. The electrical outlet of claim 1, the actuator further comprising:
a relay configured to switch the receptacle between an on state and an off state; and
a transistor switch configured to control a duty cycle at the receptacle.

10. The electrical outlet of claim 9, wherein the transistor switch controls an effective load at the receptacle using pulse width modulation.

11. The electrical outlet of claim 1, wherein the electrical parameters at the receptacle comprise one or more of voltage data, current data, reactive power data, real power data, or power factor data.

12. The electrical outlet of claim 1, the sensor further comprising:
a voltage sensor that comprises a resistive divider that measures voltage at the receptacle; and
a current sensor that comprises a hall-effect sensor that measures current at the receptacle.

13. The electrical outlet of claim 1, wherein the sensor measures a direction of power flow at the receptacle.

14. The electrical outlet of claim 13, wherein a source is connected to the receptacle, and wherein the actuator deactuates the receptacle when the sensor detects that the direction of power flow at the receptacle changes from flowing into the receptacle from the source to flowing out from the receptacle to the source.

15. The electrical outlet of claim 1, wherein the actuator is configured to selectively connect or disconnect the receptacle from an equipotential bus that is accessible to loads and sources in the microgrid.

16. The electrical outlet of claim 1, wherein the electrical outlet at least one of functions as or communicates with an agent.

17. An electrical outlet, comprising:
a first receptacle;
a second receptacle;

a first sensor operably coupled to the first receptacle, wherein the first sensor measures electrical parameters at the first receptacle;

a second sensor operably coupled to the second receptacle, wherein the second sensor measures electrical parameters at the second receptacle;

a first actuator configured to selectively actuate the first receptacle;

a second actuator configured to selectively actuate the second receptacle;

a communication module that communicates with one or more disparate electric outlets in a microgrid; and a processor that autonomously controls the first actuator and the second actuator based at least in part on the electrical parameters measured at the first receptacle, the electrical parameters measured at the second receptacle, electrical parameters received by the communication module from the one or more disparate electrical outlets in the microgrid, and a supply of generated electric power in the microgrid at a given time, wherein the microgrid is a local power grid that comprises a plurality of sources of electric power, and wherein one or more of the plurality of sources generate variable amounts of electric power over time.

* * * * *